(12) United States Patent
Kameyama

(10) Patent No.: US 8,605,118 B2
(45) Date of Patent: Dec. 10, 2013

(54) MATRIX GENERATION APPARATUS, METHOD, AND PROGRAM, AND INFORMATION PROCESSING APPARATUS

(75) Inventor: Hirokazu Kameyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 380 days.

(21) Appl. No.: 13/084,592

(22) Filed: Apr. 12, 2011

(65) Prior Publication Data

US 2011/0249001 A1    Oct. 13, 2011

(30) Foreign Application Priority Data

Apr. 13, 2010    (JP) ................................. 2010-092075

(51) Int. Cl.
*G09G 5/02*    (2006.01)
(52) U.S. Cl.
USPC .......................................................... 345/660
(58) Field of Classification Search
None
See application file for complete search history.

(56) References Cited

U.S. PATENT DOCUMENTS

| 7,133,048 B2 | 11/2006 | Brand | |
| 7,693,351 B2 | 4/2010 | Sasaki | |
| 2005/0220335 A1* | 10/2005 | Budd | 382/152 |

FOREIGN PATENT DOCUMENTS

| JP | 2004-213108 A | 7/2004 |
| JP | 2008-192031 A | 8/2008 |

OTHER PUBLICATIONS

Jia et al., "Generalized Face Super-Resolution", IEEE Trans Image Process, vol. 17, No. 6, pp. 873-886, 2008.

* cited by examiner

*Primary Examiner* — Carlos Perromat
(74) *Attorney, Agent, or Firm* — Birch, Stewart, Kolasch & Birch, LLP

(57) ABSTRACT

When $N_N$ pairs of sample data are inputted, pre-processing and area division processing are performed by a pre-processing means and area division means respectively. Thereafter, when number of classes $N_P$ is inputted to projection matrix generation means based on the $N_N$ pairs of sample data, clustering in which $N_N$ pairs of sample data are classified into $N_P$ classes. Then, representative sample data representing each of classes ($N_P$ classes) are selected from $N_N$ pairs of sample data as the learning data. Then, based on the nature of Formula (2), calculation means generates an inverse first projection matrix $(M_L)^{-1}$ using a plurality of low resolution sample images (pre-transformation sample data) of a plurality of pairs of representative sample data and a second projection matrix $M_H$ using a plurality of high resolution sample images (post-transformation sample data). Thereafter, a transformation matrix $\{M_{H'}(M_L)^{-1}\}$ is generated by transformation matrix generation means.

7 Claims, 4 Drawing Sheets

FIG.5
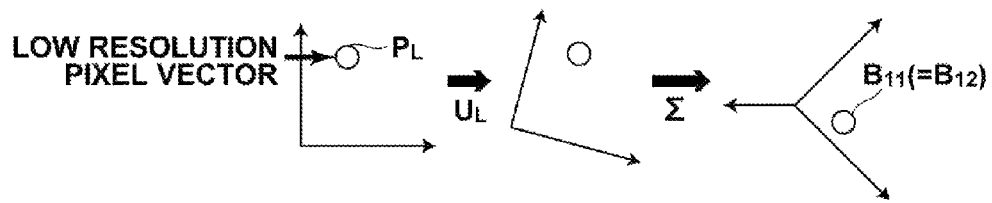
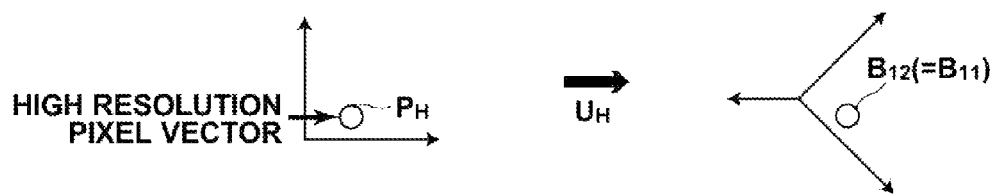
FIG.6
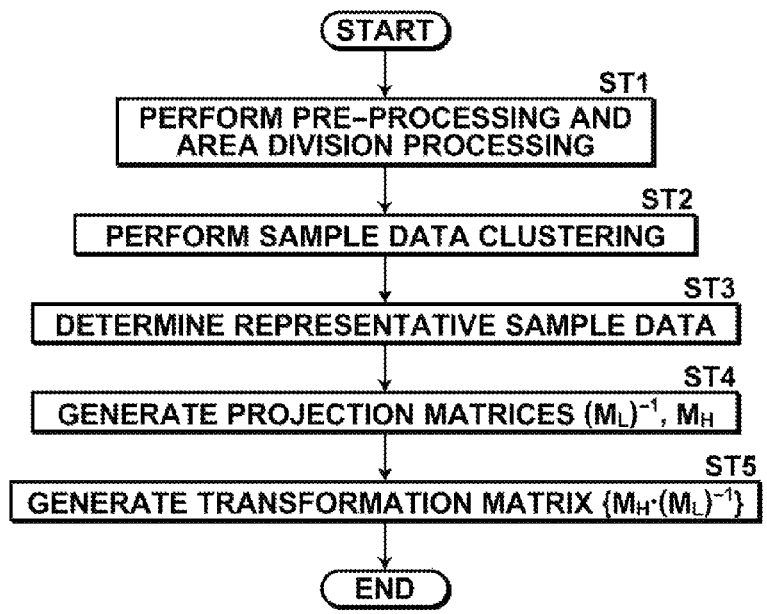

MATRIX GENERATION APPARATUS, METHOD, AND PROGRAM, AND INFORMATION PROCESSING APPARATUS

BACKGROUND OF THE INVENTION

1. Field of the Invention

The present invention relates to a matrix generation apparatus, method, and program for generating a transformation matrix for performing projection from input data to output data, and an information processing apparatus.

2. Description of the Related Art

Super resolution technology for transforming a low resolution image into a high resolution image using a transformation matrix obtained by principal component analysis (PCA), singular value decomposition (SVD), or high order singular value decomposition (HOSVD) is known as described, for example, in Japanese Unexamined Patent Publication No. 2008-192031, U.S. Pat. No. 7,693,351, Japanese Unexamined Patent Publication No. 2004-213108, and U.S. Pat. No. 7,133,048. This is a technology that, when an unknown low resolution image is inputted, transforms the low resolution image into a high resolution image using a transformation matrix obtained with respect to each object by principal component analysis (PCA) or high order singular value decomposition (HOSVD) using sample data.

One method for obtaining a transformation matrix through the high order singular value decomposition (HOSVD) is described in K. Jia and S. Gong, "Generalized Face Super-Resolution", IEEE Trans Image Process, Vol. 17, No. 6, pp. 873-886, 2008 (Hereinafter, "Non-Patent Document 1). In the Non-Patent Document 1, a pair of sample images of low resolution information and a high resolution image is provided as images used for learning and a transformation matrix is learned through high order singular value decomposition (HOSVD) in advance using the transformation relationship of the pair sample images. Here, a tensor representing a transformation relationship in each modality feature space is calculated, such as a case in which a low resolution pixel is projected into an individual difference feature space after being projected into a feature space, and further from the individual difference feature space to a high resolution pixel. Then the number of modality variations (face orientations, illumination variations, races, and the like) for transformation can be represented by the rank of the tensor (i.e., a learning model can be designed), and a high accurate restoration can be achieved by performing transformation with an input condition being satisfied.

In order to obtain a transformation matrix (U·Σ·V) for generating a high resolution image from a low resolution image, as in Non-Patent Document 1, it is necessary to obtain U and V first and then Σ. Thus, it is inevitably required to calculate base U and base V, thereby causing a problem that the calculation time for the transformation matrix can not be reduced.

In view of the circumstances described above, it is an object of the present invention to provide a matrix generation apparatus, method, and information processing apparatus capable of efficiently generating a transformation matrix having high transformation accuracy. It is a further object of the present invention to provide a computer readable recording medium on which is recorded a matrix generation program for causing a computer to perform the matrix generation method described above.

SUMMARY OF THE INVENTION

A matrix generation apparatus of the present invention is an apparatus for generating a transformation matrix used for transforming input data into output data using a plurality of pairs of sample data, each pair including pre-transformation sample data and post-transformation sample data, the apparatus including:

a projection matrix generation means for generating, on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix using the plurality of pairs of sample data; and a transformation matrix generation means for generating a transformation matrix used for transforming the input data into the output data using the first and second projection matrices generated by the projection matrix generation means.

A matrix generation method of the present invention is a method for generating a transformation matrix used for transforming input data into output data using a plurality of pairs of sample data, each pair including pre-transformation sample data and post-transformation sample data, the method including the steps of:

generating, on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix using the plurality of pairs of sample data; and generating a transformation matrix used for transforming the input data into the output data using the generated first and second projection matrices.

A computer readable recording medium on which is recorded a matrix generation program for causing a computer to generate a transformation matrix used for transforming input data into output data using a plurality of pairs of sample data, each pair including pre-transformation sample data and post-transformation sample data, the program causing the computer to perform the steps of:

generating, on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix using the plurality of pairs of sample data; and generating a transformation matrix used for transforming the input data into the output data using the generated first and second projection matrices.

The input data may be two-dimensional information, such as an image having a predetermined object, for example, face, character, graphic, symbol, texture, building, tile, branch, lung, blood vessel, and the like, or one-dimensional information, such as voice, pulsation, blood pressure, earthquake, and the like.

When the first projection matrix is taken as $M_L$ and the second projection matrix is taken as $M_H$, the transformation matrix generation means may be a means that generates $\{M_H \cdot (M_L)^{-1}\}$ as the transformation matrix.

Further, the projection matrix generation means may be a means that includes a clustering means for clustering the plurality of pairs of sample data and a sample data selection means for determining representative sample data representing each class clustered by the clustering means, and generates the first projection matrix and the second projection matrix using the representative sample data.

An information processing apparatus of the present invention is an apparatus that includes a projection means for reconstructing input data into output data using the transformation matrix generated by the matrix generation apparatus described above. The term "reconstruct" is applicable, for example, to transformation from input data representing a low resolution image into a high resolution image, transformation from a low resolution voice to a high resolution voice, and other transformation processing, such as reduction processing with reduced alias components, multi-color processing, multi-tone processing, noise reduction processing, artifact reduction processing for reducing artifacts such as block noise, mosquito noise, and the like, blur reduction processing, sharpness processing, frame rate enhancement processing, dynamic range broadening processing, color tone correction processing, distortion correction processing, encoding, and the like.

According to the matrix generation apparatus, method, and program of the present invention, based on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix are generated. Then, a transformation matrix for transforming input data into output data is generated using the generated first and second projection matrices. This allows a transformation matrix required for transforming input data into output data to be obtained in a short time while maintaining a transformation quality comparable to that of a conventional technology.

Further, when the projection matrix generation means includes a clustering means for clustering the plurality of pairs of sample data and a sample data selection means for determining representative sample data representing each class clustered by the clustering means, and generates the first projection matrix and the second projection matrix using the representative sample data, optimum representative sample data maybe determined from the viewpoint of representation of each class and correspondence between the position of the first feature vector and the position of the second feature vector as the tradeoff between processing speed and transformation quality, whereby the amount of learning sample data may be reduced appropriately and the transformation matrix generation time may further be reduced.

BRIEF DESCRIPTION OF THE DRAWINGS

FIG. 5 is a view illustrating that a first feature space vector projected from pre-transformation sample data and a second feature space vector projected from post-transformation sample data are substantially identical to each other.

FIG. 6 is a block diagram illustrating an exemplary embodiment of a matrix generation method of the present invention.

DESCRIPTION OF THE PREFERRED EMBODIMENTS

Figure 1:
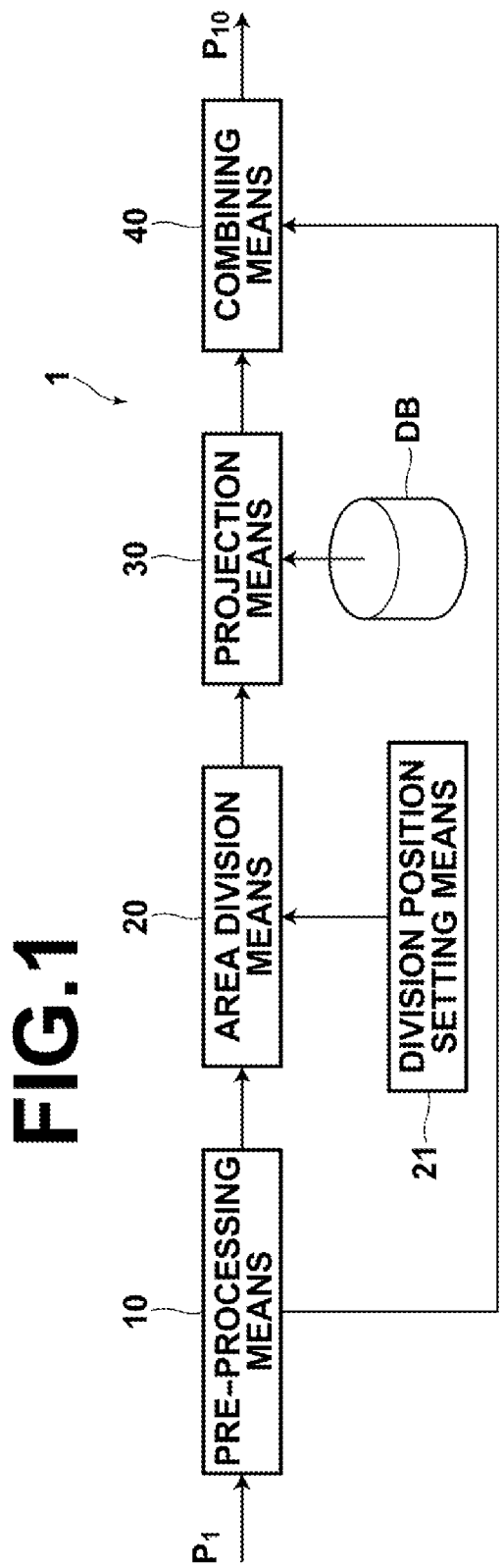
FIG. 1 is a block diagram of an exemplary embodiment of an information processing apparatus that employs a transformation matrix generated by a matrix generation apparatus of the present invention.

Hereinafter, embodiments of the present invention will be described in detail with reference to the accompanying drawings. FIG. 1 is a block diagram of an exemplary embodiment of information processing apparatus 1 that employs a transformation matrix generated by a matrix generation apparatus of the present invention. Information processing apparatus 1 shown in FIG. 1 is an image processing apparatus for performing image super resolution processing in which, when a low resolution image is inputted as pre-transformation data, a high resolution image is outputted as post-transformation data. The apparatus includes a pre-processing means 10, area division means 20, projection means 30, and combining means 40.

Pre-processing means 10 enlarges or reduces an input image so as to conform to a standard image size that allows detection. Here, any known method, such as bi-cubic, B-spline, bi-linear, nearest neighbor, or the like, may be used as the enlargement or reduction method.

Further, pre-processing means 10 has a function to perform low frequency suppression filtering on an input image P. Note that any known technology, such as unsharp mask filter, Laplacian filter, gradient filter, or the like, may be used as the high-pass filter. This may reduce illumination changes present in a low frequency region and robustness against illumination changes may be improved. Limitation of the transformation target to a high frequency component from an entire frequency range allows the entire feature space that can be used for learning to be allocated to the high frequency component.

Area division means 20 generates a plurality of partial images (input data) $P_1$ by dividing whole image $P_0$ into a grid pattern. The purpose is to limit a super resolution processing target to a local area of the image and to allow the target to be handled in a low dimension, thereby making the super resolution processing to be high quality and robust against individual differences. Note that the area division method is not limited to that described above and an area division set by division position setting means 21 may be performed.

Projection means 30 generates a partial image $P_{10}$, also called as post-transformation data, which is a partial image $P_1$, also called as pre-transformation data, enhanced in resolution by Formula (1) given below that uses a transformation matrix $\{M_{H'}(M_L)^{-1}\}$ generated by matrix generation means 50 to be described later and stored in filter database DB. Then, combining means 40 outputs a whole image $P_{10}$ which is a resolution enhanced low resolution whole image $P_1$ using partial images $P_{10}$ enhanced in resolution by projection means 30.

$$P_{10} = \{M_{H'}(M_L)^{-1}\} \cdot P_1 \tag{1}$$

Filter database DB includes a transformation matrix with respect to each type of object, size, rotation, and orientation, and projection means 30 selects a transformation matrix according to the type or the like of a partial image $P_1$ and generates a resolution enhanced partial image $P_{10}$ by Formula (1).

Figure 2:
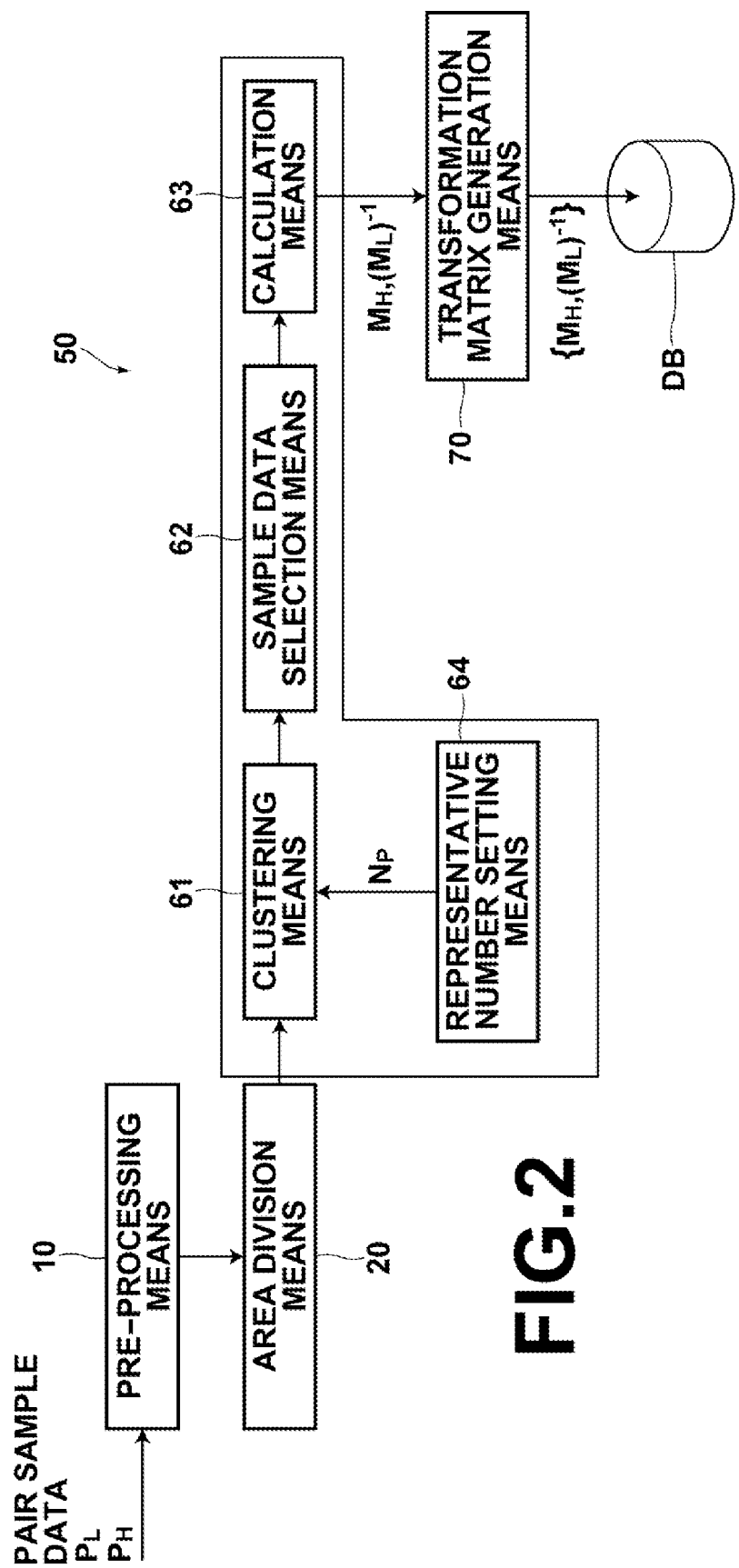
FIG. 2 is a block diagram of an exemplary embodiment of the matrix generation apparatus of the present invention.

The transformation matrix $\{M_H \cdot (M_L)^{-1}\}$ used in projection means 30 is a matrix learned based on a plurality of pairs of sample data, each pair including pre-transformation sample data and post-transformation sample data. FIG. 2 is a block diagram of an exemplary embodiment of matrix generation apparatus 50 of the present invention. Matrix generation apparatus 50 will now be described with reference to FIG. 2. Note that the configuration of matrix generation apparatus 50 is realized by executing a matrix generation program read in an auxiliary storage device on a computer (e.g., personal computer). Here, the matrix generation program is stored in an information recording medium or distributed through a network, such as the Internet, and installed on the computer.

Matrix generation apparatus 50 includes pre-processing means 10, area division means 20, projection matrix generation means 60, and transformation matrix generation means 70. Pre-processing means 10 and area division means 20 have functions identical to those of aforementioned pre-processing means 10 and area division means 20 respectively. For example, when super resolution processing is performed as in information processing apparatus 1 described above, a low resolution image is provided as the pre-transformation sample data and a high resolution image is provided as the post-transformation sample data of a pair of sample data.

Projection matrix generation means 60 generates a first projection matrix $M_L$ and a second projection matrix $M_H$ on the assumption that a first feature space vector $B_1$ generated by projecting pre-transformation sample data into a feature space and a second feature space vector $B_2$ generated by projecting post-transformation sample data into the feature space become substantially identical to each other ($B_1 = B_2$) with respect to each pair of sample data. Thereafter, transformation matrix generation means 70 generates a transformation matrix $\{M_H \cdot (M_L)^{-1}\}$ used for transforming input data to output data using the first projection matrix $M_L$ and second projection matrix $M_H$ generated by projection matrix generation means 60.

Figure 3:
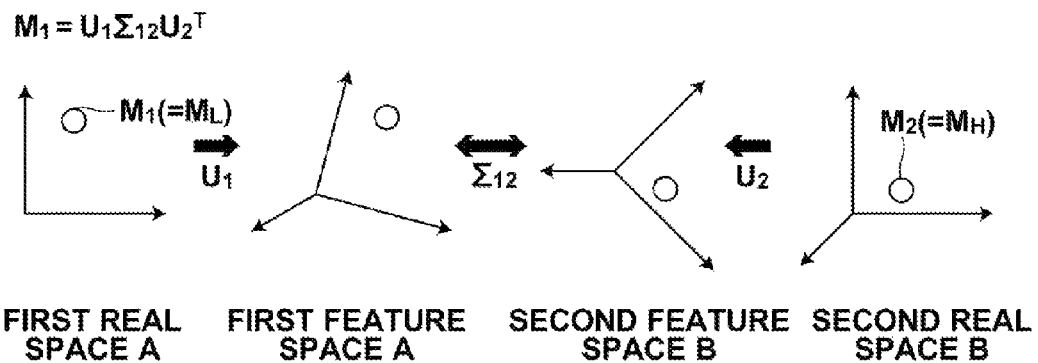
FIG. 3 is a conceptual diagram of an example transformation by high order singular value decomposition (HOSVD).

More specifically, it is assumed that the pre-transformation sample data can be directly transformed to the post-transformation data by one type of formula expressed in decomposition by high order singular value decomposition (HOSVD). The transformation by the high order singular value decomposition (HOSVD) allows transformation into a plurality of feature spaces, as illustrated in FIG. 3. For example, input data matrix $M_1$ may be represented as a multi-linear matrix $M_1 = U_1 \Sigma_{12} U_2^T$. Note that $\Sigma_{12}$ allows transformation between spaces of different ranks (tensor).

The transformation by the high order singular value decomposition (HOSVD) is applied to the transformation from pre-transformation data to post-transformation data. That is, it is assumed that, in the transformation process in FIG. 3, the second feature space vector projected from the pre-transformation data $P_L$ substantially corresponds to the second feature space vector for projecting into the post-transformation data $P_H$.

More specifically, when it is assumed that the first feature space vector $B_1$ which is the pixel vector $M_L$ of pre-transformation sample data projected by the matrix $U_L$ and the second feature space vector $B_2$ which is the pixel vector $M_H$ of post-transformation sample data projected by the matrix $U_H$ are identical in the learning process shown in FIG. 4, the pixel vector $N_H$ may be represented as Formula (2) given below.

$$M_H = U_H^{-1} \cdot \Sigma'(U_L M_L) \quad (2)$$

From Formula (2) above, $\Sigma'$ may be represented as Formula (3) given below.

$$\Sigma' = (U_H \cdot M_H) \cdot (U_L M_L)^{-1} \quad (3)$$

Likewise, when it is assumed that the first feature space vector $B_{11}$ which is the pre-transformation data $P_L$ projected by the matrix $U_L$ and the second feature space vector $B_{12}$ which is the post-transformation data $P_H$ projected by the matrix $U_H$ are identical in the restoration process shown in FIG. 5, the post-transformation data $P_H$ may be restored by Formula (4) given below.

$$P_H = U_H^{-1} \cdot \Sigma'(U_L P_L) \quad (4)$$

Then, Formula (5) given below may be derived by substituting Formula (3) in Formula (4).

$$(M_H)^{-1} \cdot P_H = (M_L)^{-1} \cdot P_L \quad (5)$$

Formula (1) above is derived by multiplying the both sides of Formula (5) by $M_H$ from the left.

Consequently, based on Formulae (1) to (4), projection matrix generation means 60 obtains the inverse first projection matrix $(M_L)^{-1}$ using a plurality of pre-transformation sample data of the plurality of pairs of sample data and the second projection matrix $M_H$ using a plurality of post-transformation sample data. More specifically, when the number of pixels of pre-transformation sample data $M_L$ and post-transformation sample data $M_H$ is taken as S (e.g., 16×16), and the number of images is taken as N (e.g., 128), a matrix of S row dimensional vector with N columns $M_L$, $M_H$ (e.g., 16×16 rows with 128 columns) is generated. Note that any known method may be used for generating the inverse first projection matrix $(M_L)^{-1}$.

In this way, a transformation matrix $\{M_H \cdot (M_L)^{-1}\}$ formed of a simple determinant like Formula (1) may be obtained, so that the amount of calculation may be reduced dramatically in comparison with the calculation for a transformation matrix using a conventional high order singular value decomposition (HOSVD) or the like. That is, when a matrix ($U \cdot \Sigma \cdot V$) based on the high order singular value decomposition (HOSVD) is used, it is necessary to obtain a tensor representing a transformation relationship between each modality feature space, such as the case in which transformation data are obtained by projecting pre-transformation data into a feature amount space and then to an individual difference space from the feature amount space. In this case, it is necessary to obtain base matrices U and V first and then matrix $\Sigma$, thus the calculation of base matrices U and V is inevitable. As such, it is impossible to reduce the calculation time for transformation matrix in an extension of this system.

Figure 4:
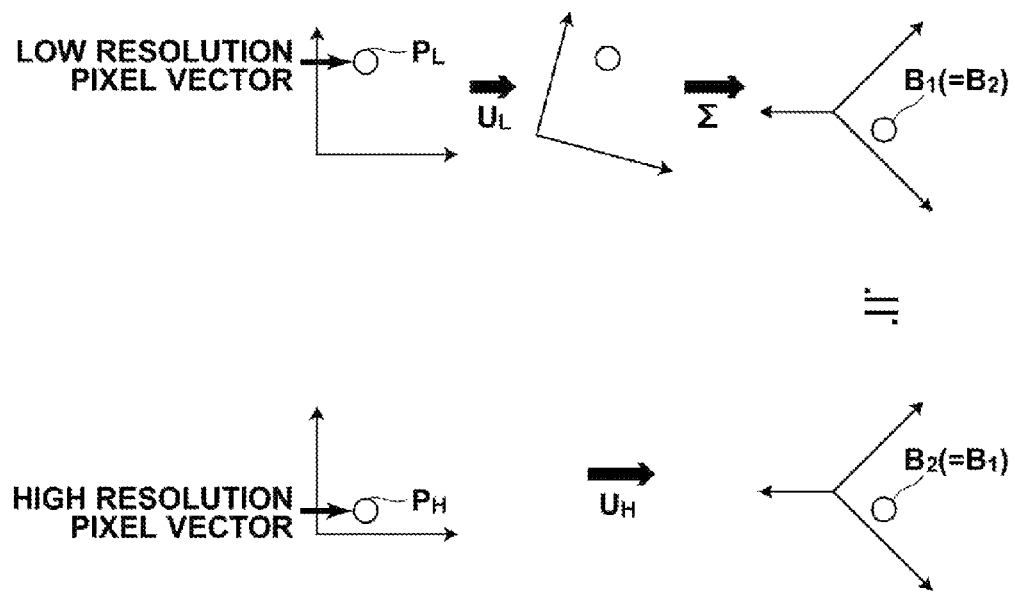
FIG. 4 is a conceptual diagram of an example transformation by a modification of the high order singular value decomposition (HOSVD) shown in FIG. 3.

In the mean time, if an inverse first projection matrix $(M_L)^{-1}$ and a second projection matrix $M_H$ are obtained based on the finding that a first feature space vector $B_1$ generated by projecting pre-transformation data by a first projection matrix $M_L$ corresponds to a second feature space vector $B_2$ generated by projecting post-transformation data by a second projection matrix $M_H$, as in FIGS. 4 and 5, the transformation matrix $\{M_H \cdot (M_L)^{-1}\}$ may be obtained. This allows a significant reduction in the matrix generation time.

Further, in order to reduce processing time while maintaining transformation accuracy, projection matrix generation means 60 shown in FIG. 2 has functions to select $N_P$ pairs of sample data from $N_N$ sample data as representative sample data for use in learning and to generate the inverse first projection matrix $(M_L)^{-1}$ and second projection matrix $M_H$ using the selected $N_P$ pairs of sample data. More specifically, projection matrix generation means 60 includes clustering means 61, sample data selection means 62, and calculation means

63. Clustering means 61 classifies $N_N$ sample data into $N_P$ classes by clustering. Any known method, such as k-means method, GMM+EM algorithm, SVM, Boosting, random forest, or the like, may be used for the classification by clustering, and a representative value is calculated with respect to each of $N_P$ classes by the method used. Note that the number of classes $N_P$ may be a number set in advance or a number set by representative number setting means 64 according to input from an input means.

Sample data selection means 62 determines sample data having a value closest to the representative value of each class as representative sample data. As there are $N_P$ classes, $N_P$ representative sample data will result. More specifically, sample data selection means 62 determines the representative sample data using Euclidean distance, Mahalanobis' generalized distance, K-L distance, or the like. For example, sample data whose feature vector $dN_j$ (j=1 to N) has a smallest distance to a feature vector $dN_i$ (i=1 to P) at the representative point of each class is determined as representative sample data representing each class (=min ($dN_i - dN_j$)). Further, representative sample data may be selected by obtaining $\Delta = |(M_H)^{-1} \cdot P_{10} - (M_L)^{-1} \cdot P_1|/|(M_H)^{-1} \cdot P_{10} + (M_L)^{-1} \cdot P_1|$ using the nature of Formula (1) above and based on min ($w1 \cdot dNP_i - dNN_j$)+(1−w1)·$\Delta_j$) (w1: weight of 0 to 1). That is, sample data having a larger $\Delta$ is made more unlikely to be selected as the representative sample data. Then calculation means 63 generates the inverse first projection matrix $(M_L)^{-1}$ and second projection matrix $M_H$ using a pair of sample data selected as the representative sample data.

This allows the transformation matrix $\{M_H \cdot (M_L)^{-1}\}$ to be generated by ensuring both fast learning speed and high image quality. That is, in order to improve learning speed, it is necessary to reduce the number of learning samples. On the other hand, in order to improve image quality, it is necessary to increase the number of learning samples. Consequently, as the tradeoff between processing speed and transformation quality, representative sample data representing each class are determined or optimum representative sample data are determined based on the nature of Formula (1), whereby the amount of sample data required for learning may be reduced and the transformation matrix generation time may further be reduced.

FIG. 6 is a block diagram illustrating an exemplary embodiment of a matrix generation method of the present invention. The matrix generation of the present invention will be described with reference to FIGS. 2 to 6. First, when $N_N$ pairs of sample data are inputted, pre-processing and area division processing are performed by pre-processing means 10 and area division means 20 respectively (step ST1). Thereafter, when number of classes $N_P$ is inputted based on the $N_N$ pairs of sample data, projection matrix means 60 classifies $N_N$ pairs of sample data into $N_P$ classes by clustering (step ST2). Then, representative sample data representing each of classes ($N_P$ classes) are selected from $N_N$ pairs of sample data as the data used for learning (step ST3). Then, based on the nature of Formula (2) above, calculation means 63 generates an inverse first projection matrix $(M_L)^{-1}$ using a plurality of pre-transformation sample data of a plurality of pairs of representative sample data and a second projection matrix $M_H$ using a plurality of post-transformation sample data (step ST4). Thereafter, a transformation matrix $\{M_H \cdot (M_L)^{-1}\}$ is generated by transformation matrix generation means 70 and stored in the filter database DB.

According to the embodiment described above, a first projection matrix $M_L$ and a second projection matrix $M_H$ are generated from a plurality of pairs of sample data on the assumption that a first feature space vector $B_1$ generated by projecting pre-transformation sample data into a feature space using the first projection matrix $M_L$ and a second feature space vector $B_2$ generated by projecting post-transformation sample data into the feature space using the second projection matrix $M_H$ become substantially identical to each other with respect to each pair of sample data. Then a transformation matrix $\{M_H \cdot (M_L)^{-1}\}$ used for transforming input data to output data is generated using the first projection matrix $M_L$ and second projection matrix $M_H$. This allows a transformation matrix required for transforming input data into output data to be obtained in a short time while maintaining a transformation quality comparable to that in the past.

Further, where projection matrix generation means 60 includes clustering means 61 for clustering a plurality of sample data and sample data selection means 62 for determining representative sample data representing each class clustered by clustering means 61, and transformation matrix generation means 70 is a means that generates an inverse first projection matrix $(ML)^{-1}$ and second projection matrix $M_H$ using the representative sample data, as illustrated in FIG. 2, optimum representative sample data may be determined from the viewpoint of representation of each class and correspondence between the position of the first feature vector $B_1$ and the position of the second feature vector $B_2$ as the tradeoff between processing speed and transformation quality, whereby the amount of learning sample data may be reduced appropriately and the transformation matrix generation time may further be reduced.

Embodiments of the present invention are not limited to those described above. The description has been made of a case in which the input data representing an image. But, the input data may be data representing, for example, a blood vessel or a particular tissue presents in a living body, a high molecule in a living body, such as tumor, tissue, cell, protein, DNA, or RNA, a low molecule, or the like. In addition, the input data may be a compound such as medicine or protein, money, card, such as cash card, vehicle, or car registration plate, or character, drawing, table, or photograph in a document scanned by a scanner such as a copier.

Further, the description has been made of a case in which image processing for super resolution is performed by information processing apparatus 1 shown in FIG. 1. But information processing apparatus 1 may also be used for transformation from a low resolution voice to a high resolution voice and other transformation processing, such as reduction processing with reduced alias components, multi-color processing, multi-tone processing, noise reduction processing, artifact reduction processing for reducing artifacts such as block noise, mosquito noise, and the like, blur reduction processing, sharpness processing, frame rate enhancement processing, dynamic range broadening processing, color tone correction processing, distortion correction processing, encoding, and the like.

What is claimed is:

1. A matrix generation apparatus for generating a transformation matrix used for transforming input data into output data using a plurality of pairs of sample data, each pair including pre-transformation sample data and post-transformation sample data, the apparatus comprising:

a projection matrix generation means for generating, on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix using the plurality of pairs of sample data; and a transformation matrix generation means for generating a transformation matrix used for transforming the input data into the output data using the first and second projection matrices generated by the projection matrix generation means.

2. The matrix generation apparatus of claim 1, wherein, when the first projection matrix is taken as $M_L$ and the second projection matrix is taken as $M_H$, the transformation matrix generation means generates $\{M_H \cdot (M_L)^{-1}\}$ as the transformation matrix.

3. The matrix generation apparatus of claim 1, wherein the projection matrix generation means includes a clustering means for clustering the plurality of pairs of sample data and a sample data selection means for determining representative sample data representing each class clustered by the clustering means, and generates the first projection matrix and the second projection matrix using the representative sample data.

4. The matrix generation apparatus of claim 1, wherein the input data represent a low resolution image, the output data represent a high resolution image, and the sample data include a low resolution sample image and a high resolution sample image as a pair.

5. An information processing apparatus, comprising a projection means for reconstructing input data into output data using the transformation matrix generated by the matrix generation apparatus of claim 1.

6. A matrix generation method implemented by a computer comprising a processor for generating a transformation matrix used for transforming image input data into image output data using a plurality of pairs of sample data, each pair including pre-transformation sample data and post-transformation sample data, the method comprising the steps performed by the processor of: generating, on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix using the plurality of pairs of sample data; and generating a transformation matrix used for transforming the input data into the output data using the generated first and second projection matrices.

7. A computer readable recording medium on which is recorded a matrix generation program for causing a computer to generate a transformation matrix used for transforming input data into output data using a plurality of pairs of sample data, each pair including pre-transformation sample data and post-transformation sample data, the program causing the computer to perform the steps of:

generating, on the assumption that a first feature space vector generated by projecting the pre-transformation sample data into a feature space by a first projection matrix and a second feature space vector generated by projecting the post-transformation sample data into the feature space by a second projection matrix are substantially identical to each other with respect to each pair of sample data, the first projection matrix and the second projection matrix using the plurality of pairs of sample data; and generating a transformation matrix used for transforming the input data into the output data using the generated first and second projection matrices.

* * * * *